(12) United States Patent
Riggs

(10) Patent No.: US 6,702,980 B2
(45) Date of Patent: Mar. 9, 2004

(54) ANNEALING APPARATUS

(75) Inventor: Richard H. Riggs, Saline, MI (US)

(73) Assignee: Martinrea Industries, Inc., Dexter, MI (US)

( * ) Notice: Subject to any disclaimer, the term of this patent is extended or adjusted under 35 U.S.C. 154(b) by 11 days.

(21) Appl. No.: 10/136,750

(22) Filed: Apr. 30, 2002

(65) Prior Publication Data

US 2003/0201584 A1 Oct. 30, 2003

(51) Int. Cl.[7] .............................................. G21D 1/06
(52) U.S. Cl. ...................................... 266/258; 148/570
(58) Field of Search ........................... 266/258; 148/567, 148/570, 639, 640

(56) References Cited

U.S. PATENT DOCUMENTS

| | | | | | |
|---|---|---|---|---|---|
| 3,347,716 A | * | 10/1967 | Evans | .......................... | 148/570 |
| 3,790,413 A | * | 2/1974 | Kanetake | ..................... | 148/567 |
| 3,801,382 A | * | 4/1974 | Ettenreich | .................... | 148/570 |
| 5,414,246 A | * | 5/1995 | Shapona | ...................... | 219/640 |

* cited by examiner

Primary Examiner—Scott Kastler
(74) Attorney, Agent, or Firm—Gifford, Krass, Groh, Sprinkle, Anderson & Citkowski, P.C.

(57) ABSTRACT

An apparatus is disclosed for annealing only a portion of an elongated tubular workpiece. The apparatus includes an elongated tube dimensioned to receive the workpiece so that a first end of the workpiece together with the portion to be annealed is positioned within the tube while a second end of the workpiece extends outwardly from the tube. An induction coil is disposed coaxially around only a portion of the workpiece portion exteriorly of the tube while a source of pressurized nitrogen/hydrogen is fluidly connected to the interior of the tube. In an annealing operation, the tube is filled with hydrogen/nitrogen and the induction coil is energized thus heating only the portion of the workpiece for which annealing is desired. Simultaneously, hydrogen/nitrogen flows through the tube thus cooling the workpiece and maintaining an oxygen-free environment within the tube.

7 Claims, 1 Drawing Sheet

ANNEALING APPARATUS

BACKGROUND OF THE INVENTION

I. Field of the Invention

The present invention relates to an annealing apparatus for annealing only a portion of a tubular workpiece.

II. Description of Related Art

There are many circumstances in industry where it is desired to anneal a tubular workpiece. For example, when the tubular workpiece has been deformed into the desired shape, annealing the now deformed workpiece relieves not only stress and strain within the workpiece, but also prevents micro cracks which may be formed in the workpiece during the forming process. The annealing process, however, oftentimes disadvantageously weakens the workpiece.

Previously, in order to anneal metal workpieces, the metal workpieces are conventionally placed within an annealing furnace and heated to their annealing temperature. Simultaneously, in order to prevent discoloration of certain workpieces, for example stainless steel workpieces, the workpieces are kept within an oxygen-free nitrogen and/or hydrogen atmosphere.

A primary disadvantage of these previously known annealing furnaces is that such annealing furnaces are expensive to maintain and operate.

A still further disadvantage of these previously known annealing furnaces is that the annealing furnaces anneal the entire workpiece. However, since the entire workpiece is subjected to the annealing temperatures, rather than only the portion for which annealing is needed, the annealing process may unduly weaken the entire workpiece.

SUMMARY OF THE PRESENT INVENTION

The present invention provides an apparatus for annealing a workpiece, such as an automotive fuel fill pipe, which overcomes all of the above-mentioned disadvantages of the previously known devices.

In brief, the apparatus of the present invention comprises an elongated tube which is dimensioned to receive the workpiece so that a first end of the workpiece as well as the portion of the workpiece to be annealed is positioned within the tube while a second end of the workpiece extends outwardly from the tube. Furthermore, only a portion of the workpiece has been deformed so that annealing of only that portion is desired.

An induction coil is disposed coaxially only around the portion of the workpiece for which annealing is desired and this induction coil is positioned outside the tube. Upon energization of the induction coil, the induction coil locally heats to annealing temperature only the portion of the workpiece for which annealing is desired.

The apparatus further includes a source of pressurized nitrogen and/or hydrogen which is fluidly connected by a conduit to the second end of the workpiece. Nitrogen/hydrogen thus flows from the source, and into the interior of the tube thus creating an oxygen-free environment within the tube prior to energization of the coil. This nitrogen continues to flow upwardly through the interior of the workpiece and downwardly along the exterior of the workpiece during energization of the coil. Ultimately, the nitrogen/hydrogen gas is exhausted out through the second end of the tube. In practice, this nitrogen/hydrogen flow through and around the workpiece during induction heating of the workpiece by the induction coil minimizes discoloration of the workpiece.

BRIEF DESCRIPTION OF THE DRAWING

A better understanding of the present invention will be had upon reference to the following detailed description of the present invention, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figures 1, 2:
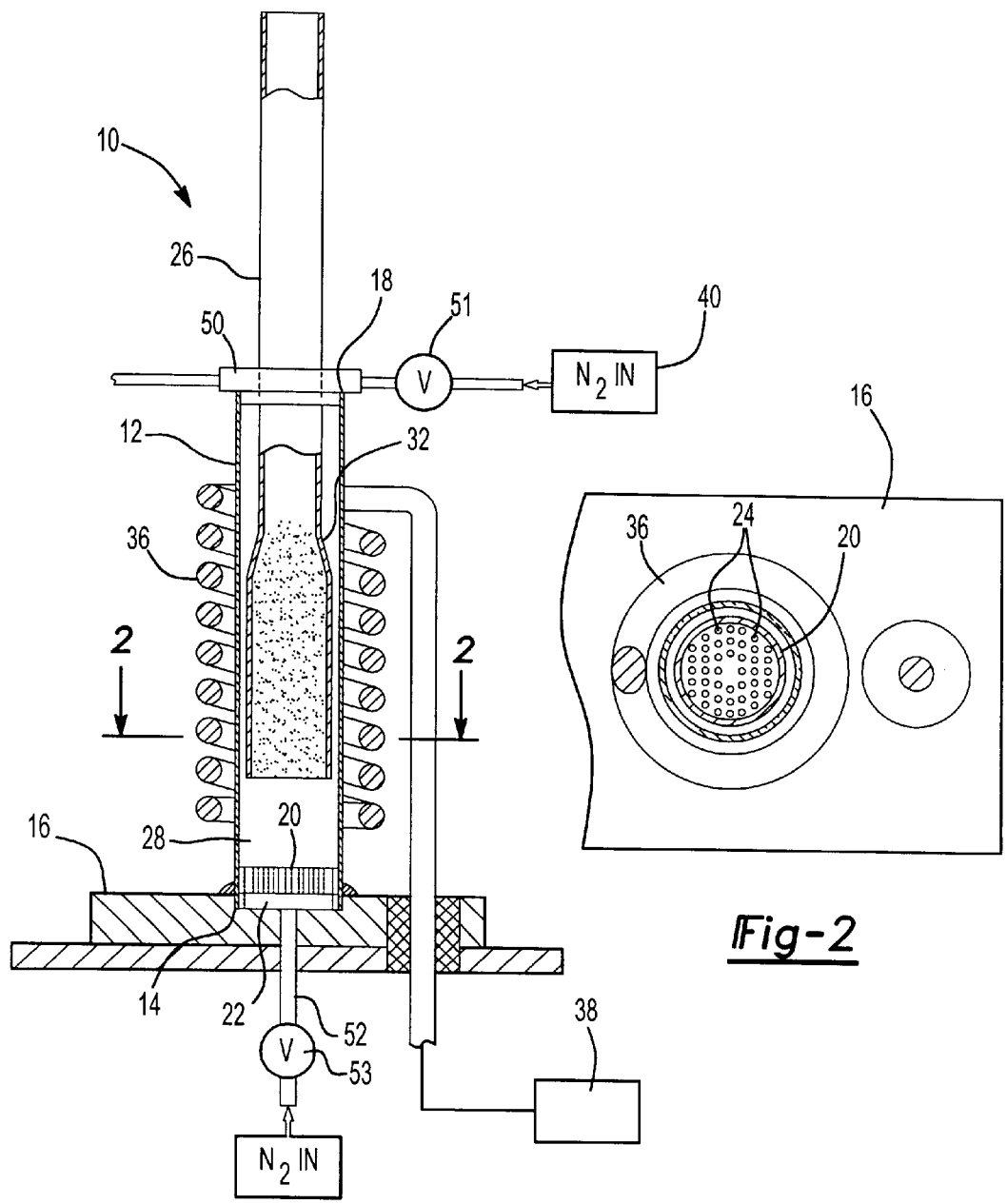
FIG. 1 is a longitudinal sectional view illustrating a preferred embodiment of the present invention.
FIG. 2 is a view taken substantially along line 2—2 in FIG. 1.

With reference to the drawing, a preferred embodiment of the annealing apparatus 10 of the present invention is there shown and comprises an elongated tube 12 having a first end 14 secured to and supported by a base 16. The other or second end 18 of the tube 12 is open. The tube 12, furthermore, is constructed of a nonmetallic material capable of withstanding high temperatures, such as a quartz tube.

A plate 20 is disposed across the tube 12 adjacent to, but spaced upwardly from, its end 14 thus forming a chamber 22 between the base 16, tube 12 and plate 20. The plate 20 also includes a plurality of through openings 24 for a purpose to be subsequently described.

The tube 12 is dimensioned to receive a portion of an elongated tubular metal workpiece 26, such as an automotive fuel fill pipe, within its interior so that a first end 28 of the workpiece 26 is spaced upwardly from the plate 20. A cap 50 functionally engages the workpiece 26 and supports the workpiece 26 within the tube 12 so that the other or second end 30 of the workpiece 26 protrudes outwardly from the second end 18 of the tube 12. Alternatively, a support extending between the base 16 and workpiece 26 may be used to hold the workpiece 26 within the tube 12.

The workpiece 26 includes a formed or expanded portion 32 which extends only partway along the longitudinal length of the workpiece 26 and this portion 32 is positioned within the tube 12. In practice, it is desired to only anneal the formed portion 32 of the workpiece 26 to thereby maintain the strength and hardness of the remainder or unformed portion of the workpiece 26.

An induction coil 36 is coaxially disposed around only the formed portion 32 of the workpiece 26. Preferably, the induction coil 36 is positioned exteriorly of the tube 12. The induction coil 36 is electrically connected to any conventional energization source 38 so that, upon energization of the induction coil 36 by the source 38, the induction coil 36 induces localized heating only in the form or expanded portion 32 of the workpiece 26.

In operation, in order to minimize discoloration of the workpiece 26 during the annealing process, particularly when the workpiece 26 is made of stainless steel, nitrogen and/or hydrogen is flowed both through and around the workpiece 26 both prior to and during the annealing process to create an oxygen-free environment within the tube during the annealing process. In the preferred embodiment of the invention, a valve 53 is opened to allow the hydrogen and/or nitrogen (hereinafter referred to as "inert") gas to flow from an inert gas source into the interior of the workpiece 26 via the chamber 22 for about five seconds to fill the interior of the workpiece with the inert gas and exhaust through the second end of the workpiece 26.

Thereafter, a second valve 51 is opened thus allowing the inert gas to flow from the inert gas source 40 through fluid ports formed in the cap 50 and downwardly along the sides of the workpiece 26. The inert gas flow through the second valve 51 is greater than through the first valve 53 so that the inert gas flows downwardly around the outer surface of the workpiece 26 and then up through the workpiece 26. The cap 50 preferably seals the tube 12 to the workpiece 26.

After the second valve 51 is opened, the coil 36 is energized for about sixteen seconds thereby reaching the desired annealing temperature of about 1975° F. Thereafter, the coil 36 is deenergized, and the inert gas continues to cool the workpiece 26. After cooling, the workpiece 26 is removed from the tube 12.

A primary advantage of the present invention is that, since the induction coil is only disposed around the formed portion 32 of the workpiece 26, only the formed portion 32 of the workpiece 26 is annealed during the annealing process. This formed portion typically forms less than half of the longitudinal length of the workpiece 26 so that the hardness of the workpiece in its unformed portion is maintained and unaffected by the annealing process.

Therefore, it can be seen that the present invention provides a simple and yet effective apparatus for annealing only a portion of a workpiece. Having described my invention, however, many modifications thereto will become apparent to those skilled in the art to which it pertains without deviation from the spirit of the invention as defined by the scope of the appended claims.

I claim:

1. Apparatus for annealing only a portion of an elongated tubular metal workpiece comprising:

an elongated tube dimensioned to receive the workpiece so that a first end of the workpiece is positioned adjacent a first end of said tube and a second end of the workpiece extends outwardly from a second end of said tube and so that a workpiece portion is contained within said tubes, an induction coil disposed coaxially around said workpiece portion, a source of pressurized oxygen-free inert gas, a fluid conduit having one end fluidly connected to said inert gas source and a second end fluidly connected to an interior of the tube, wherein inert gas from said inert gas source flows through the interior of the tubular workpiece and around an outer surface of the workpiece, a base disposed across and closing said first end of said elongated tube, a plate disposed across said elongated tube at a position spaced from said base and forming a chamber between said plate and said base, said plate having a plurality of through openings, and said source of pressurized inert gas being fluidly connected to said chamber.

2. The invention as defined in claim 1 wherein said tube is disposed between said induction coil and the workpiece.

3. The invention as defined in claim 1 and comprising a cap disposed across said second end of said tube in a sealing engagement, said cap having a bore through which the workpiece extends.

4. The invention as defined in claim 1 and comprising a base attached to said second end of said tube, and an elongated support having one end attached to said base and another end removably attached to and supporting the workpiece adjacent the first end of the workpiece.

5. The invention as defined in claim 1 wherein said source of pressurized oxygen-free gas comprises a source of pressurized hydrogen.

6. The invention as defined in claim 1 wherein said source of pressurized oxygen-free gas comprises a source of pressurized nitrogen.

7. The invention as defined in claim 1 wherein said source of pressurized oxygen-free gas comprises a source of pressurized hydrogen and nitrogen mixture.

* * * * *